United States Patent
James et al.

(10) Patent No.: US 6,691,393 B2
(45) Date of Patent: Feb. 17, 2004

(54) WEAR RESISTANCE IN CARBON FIBER FRICTION MATERIALS

(75) Inventors: Mark C. James, South Bend, IN (US); Terence B. Walker, South Bend, IN (US); Neil Murdie, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 139 days.

(21) Appl. No.: 10/036,793

(22) Filed: Nov. 8, 2001

(65) Prior Publication Data

US 2002/0170787 A1 Nov. 21, 2002

Related U.S. Application Data

(60) Provisional application No. 60/282,428, filed on Apr. 9, 2001.

(51) Int. Cl.[7] ............................................. B23P 17/00
(52) U.S. Cl. .................................... 29/419.1; 29/412
(58) Field of Search ................................ 29/419.1, 412; 188/218; 428/293.1, 293.4, 293.7; 264/29.5, 29.6, 29.1; 423/447.4; 28/103, 107; 442/383

(56) References Cited

U.S. PATENT DOCUMENTS

| | | | |
|---|---|---|---|
| 3,909,891 A | * 10/1975 | Dilo | 28/4 R |
| 3,971,669 A | 7/1976 | Wrzesien et al. | 156/181 |
| 4,284,680 A | * 8/1981 | Awano et al. | 428/234 |
| 4,396,663 A | * 8/1983 | Mitchell et al. | 428/111 |
| 4,490,201 A | * 12/1984 | Leeds | 156/155 |
| 5,388,320 A | 2/1995 | Smith et al. | |
| 5,546,880 A | 8/1996 | Ronyak et al. | |
| 5,882,781 A | * 3/1999 | Lawton et al. | 428/293.1 |

FOREIGN PATENT DOCUMENTS

GB 2356642 B 12/2001

* cited by examiner

Primary Examiner—John C. Hong
(74) Attorney, Agent, or Firm—Larrt J. Palguta

(57) ABSTRACT

Carbon fiber brake preforms (20), specifically, annular discs built up of fabric arc segments (21) composed of continuous fibers (25) and staple fibers (26). Most of the continuous fibers (25) in the fabric segments (21) are arranged to be located within 60° of radially from the inner diameter to the outer diameter of the annular disc (20). The fabric arc segments have substantially all of their continuous fibers oriented in the radial direction and parallel to the segment arc bisector, or the segments are arranged in alternating layers in which, respectively, half the continuous fibers are oriented at a +45 degree angle with respect to the segment arc bisector and half the continuous fibers are oriented at a −45 degree angle with respect thereto. Methods for making preform composites comprise providing needle-punched nonwoven fabric of unidirectional continuous fibers and staple fibers, making a plurality of fabric segments, arranging the segments in a multilayered intermediate, heating the multilayered intermediate to convert the fibers to carbon, and densifying the carbonized product. In brake discs made as described, fiber pull-out is minimized, reducing mechanical wear. The disclosed preform fiber architecture reduces wear rates while maintaining brake disc strength.

4 Claims, 2 Drawing Sheets

WEAR RESISTANCE IN CARBON FIBER FRICTION MATERIALS

This application claims priority under 35 USC 119(e) to provisional application No. 60/282,428, which was filed on Apr. 9, 2001, the entire contents of which is hereby incorporated by reference.

BACKGROUND OF THE INVENTION

1. Field of the Invention

This invention relates to fibrous substrates useful in the manufacture of carbon fiber/carbon matrix composites, and to carbon fiber/carbon matrix composites manufactured therefrom. Representative of such composites are aircraft and high performance automotive brake discs made by depositing carbon matrices on carbon fiber substrates of this invention and subsequently carbonizing the combinations to provide carbon matrices that are reinforced with carbon fibers.

2. Related Art

Many advances have been made over the years in the art relating to brake discs.

U.S. Pat. No. 5,388,320 describes the manufacture of carbonizable needle-punched filamentary structures (typically, annular performs) made up of layers of unidirectional filaments and staple fibers. These structures can be used to make shaped articles (typically, brake discs) of carbon reinforced with carbon fibers. As taught in column 7 of the patent, some of the arc segments used to make up the structures are cut in such a way that the majority of the filaments extend substantially radially of the eventual annulus, while others are cut so that the majority of the filaments extend substantially chordally of the annulus. The former segments have greater dimensional stability in the radial direction and the latter segments have greater dimensional stability in the chordal direction.

U.S. Pat. No. 5,546,880 describes fibrous substrates for the product of carbon fiber reinforced composites comprising multilayered annular shaped fibrous structures, suitable for use in the manufacture of friction discs, made from multidirectional fabric, that is, fabric having filaments or fibers extending in at least two directions.

The present invention involves the recognition that, in carbon fiber composite friction linings, the orientation of the fiber at the friction surface plays a major role in the wear characteristics of the material. When fibers of opposing direction on the friction surfaces slide against each other, mechanical wear takes place and the fiber bundles are torn form the friction surface. This fiber pull-out leads to breakdown of the surrounding matrix of carbon. As more areas of fiber pull-out occur on the friction surface, the matrix surrounding these fibers also breaks down to fill the voids created. This results in a reduction in the overall thickness of the frictional material.

SUMMARY OF THE INVENTION

This invention addresses the need of both brake manufacturers and their customers, by increasing the field life (via reduction of the wear rate) of carbon fiber friction materials and thereby reducing the cost of ownership.

Methods for manufacturing annular preforms made from tows of oxidized polyacrylonitrile continuous filaments are described in U.S. Pat. No. 5,388,320, the entire contents of which are hereby expressly incorporated by reference. In the new preform technology of the present invention, fiber orientation in the preform is in the radial direction. This means that the continuous fibers run mainly from the inner diameter to the outer diameter of the annular disc. By orienting the fibers in this fashion, fiber pull-out is minimized, thereby reducing mechanical wear. Testing has shown that by using this preform fiber architecture, wear rates can be reduced up to 40 percent while maintaining disc strength and integrity.

One embodiment of this invention is a carbon fiber brake preform comprising an annular disc built up of fabric arc segments composed of from 90 to 70 weight-% continuous fibers and from 10 to 30 weight-% staple fibers. A typical annular disc of this invention may, for instance, be composed of 85 weight-% continuous fibers and 15 weight-% staple fibers. Preferably, both the continuous fibers and the staple fiber are oxidized polyacrylonitrile fibers. In this preform, at least 80% of the continuous fibers in the fabric segments are arranged to be located within 60° of radially from the inner diameter to the outer diameter of the annular disc. Thus, for instance, the fabric arc segments may be arranged with substantially all of their continuous fibers oriented in the radial direction and parallel to the segment arc bisector, or the fabric arc segments may be arranged in alternating layers in which, respectively, approximately half of their continuous fibers are oriented at a +45 degree angle with respect to the segment arc bisector and approximately half of their continuous fibers are oriented at a −45 degree angle with respect to the segment arc bisector.

Another embodiment of this invention is a method for making a preform composite. The method includes the steps of: a.) providing a needle-punched nonwoven fabric comprising a major portion of unidirectional continuous fiber and a minor portion of staple fiber; b.) making from this fabric a plurality of segments having the outside diameter and the inside diameter of the preform to be manufactured from the fabric; c.) arranging the segments in a multilayered intermediate to a weight and dimension calculated to provide a desired preform density for the application; d.) heating the multilayered intermediate to a temperature above 1500° C. in an inert atmosphere for an amount of time sufficient to convert the fibers to carbon; and e.) densifying the carbonized product by carbon deposition to the desired preform density. The segments may be arranged in step c.) with their continuous fibers oriented in the radial direction and parallel to the segment arc bisector or in alternating layers in which their continuous fibers are oriented alternatively at a +45 degree angle with respect to the segment arc bisector and at a −45 degree angle with respect to the segment arc bisector. The carbonized product may be densified in step e.) using Chemical Vapor Infiltration/Chemical Vapor Deposition. A typical density for a finished disc produced by this method is in the range 1.70–1.80 g/cc.

Still another embodiment of this invention is a method of reducing wear in an annular brake disc which comprises manufacturing said disc from preforms reinforced with a plurality of continuous fibers in which at least about 80% of the continuous fibers are aligned in a generally radial manner, for instance within 60° of the radii of the annular brake disc. In two specific cases, the continuous fibers are located on the radii of the annular brake disc or the continuous fibers are located at angles of 45° from the radii of said annular brake disc. Using this method, wear of the brake disc may be reduced, for example, by 25% or more compared to wear of an otherwise comparable brake disc made from preforms in which half of the continuous fibers are located outside of the 120° arcs bisected by the radii of each of the preform segments.

Finally, this invention provides a shaped fibrous fabric structure having an annular disc configuration and being formed of multiple, successively-stacked layers of abutting fabric arc segments composed of from 90 to 70 weight-% continuous fibers and from 10 to 30 weight-% staple fibers, the fabric arc segment layers being interconnected by at least a portion of the staple fibers, wherein at least 80% of the continuous fibers in the fabric arc segments are located within 60° of radially from the inner diameter to the outer diameter of the annular disc. The fabric arc segments may be arranged with their continuous fibers oriented in the radial direction and parallel to the segment arc bisector, or they may be arranged in alternating layers in which their continuous fibers are oriented alternatively at a +45 degree angle with respect to the segment arc bisector and at a −45 degree angle with respect to the segment arc bisector.

Implementation of these new fiber preform architectures (radial and +/−45°) enables the brake manufacturer to produce fewer friction linings to meet existing airline requirements. In addition, the brake manufacturer will be able to meet increasing demand without further capital investment by utilizing the excess production capacity created by this technology.

Additional advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The drawings that accompany this application are presented by way of illustration only, and do not limit the scope of the present invention.

DETAILED DESCRIPTION OF THE INVENTION

Figure 1A:
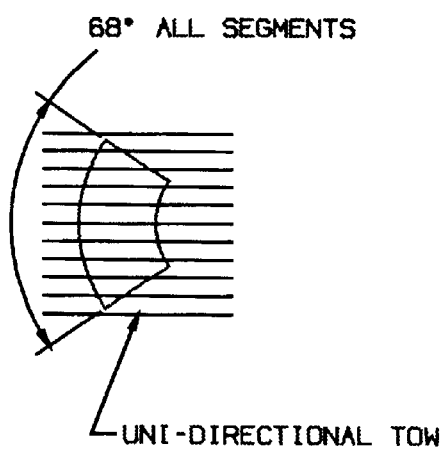
FIGS. 1A and 1B are top plan views of two different fabric segment orientations that may be used in accordance with the present invention.
Figure 1B:
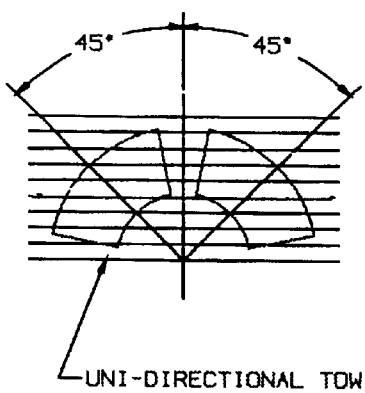
Figure 1C:
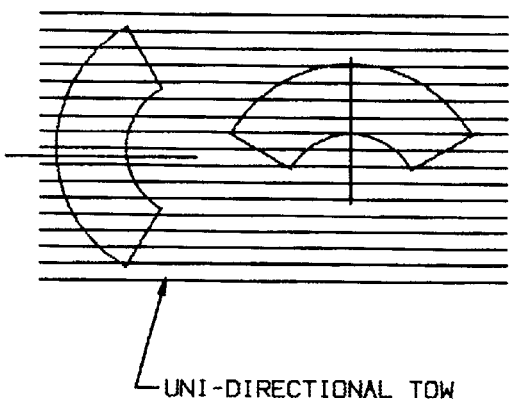
FIG. 1C is a top plan view of prior art fabric segment orientations.

FIGS. 1A and 1B illustrate preform fabric segments that may be used according to the present invention, while FIG. 1C illustrates prior art preform segments such as those shown in FIG. 5 of U.S. Pat. No. 5,388,320. In all of these Figures, the fields of horizontal lines represent continuous fibers. FIG. 1A depicts a fabric segment in which a continuous fiber is situated in the radius of a segment, while FIG. 1B depicts fabric segments oriented such that their radii describe an angle of 45° with respect to the direction of the continuous fibers in the fabric. FIG. 1C, which is illustrative of the prior art, includes a fabric segment oriented such that its radius describes an angle of 90° with respect to the direction of the continuous fibers in the fabric. The presence of such fabric segments (that is, 90° orientation) in a preform provides carbon fiber/carbon matrix composites that are subjected to greater frictional wear than are similar composites manufactured in accordance with the present invention.

The Fabric

The following process may be used to manufacture fabric segments in accordance with the present invention. A carded web is crosslapped to achieve a desired areal weight, and then needle punched to form a staple fiber web fabric. The staple fiber web could alternatively be formed by airlaying the staple fibers. Separately, large continuous tows are spread, using a creel, to form a sheet of the desired areal weight. The sheet is processed through a needle loom to impart integrity to the continuous fiber fabric. This fabric is known as a continuous tow fabric. Then the staple fiber web is needle punched into the continuous tow fabric to form what is called a duplex fabric. The +45°, −45°, and radial segments used in accordance with the present invention are cut from the duplex fabric.

One aspect of this invention is manufacturing the preform from segments that have been cut from nonwoven fabric composed mainly of unidirectional continuous fiber. The nonwoven fabric will also contain a minor but significant percentage (typically, from 10 to 30 weight-%) of staple fiber, which provides structural integrity upon needle-punching. Excellent results may be obtained with a fabric made up, for example, of 85 weight-% unidirectional continuous fiber and 15 weight-% staple fiber. Generally, the fabric is composed of a carded needled punched staple web which has been needled to a layer of needle punched continuous tow. The resulting fabric is known as a duplex fabric.

The fiber used to produce this nonwoven fabric must be of a carbonaceous nature. Oxidized polyacrylonitrile (OPAN) fiber is particularly preferred, although other conventional fibers including thermoset pitch fibers, unoxidized polyacrylontrile fibers, carbon fibers, graphite fibers, ceramic fibers, and mixtures thereof, may be used. In accordance with the present invention, the fiber is used as a strand of continuous filaments, generally referred to as a "tow". The staple fiber used in this invention may be selected from the same types of fibers as the continuous fiber. It need not necessarily be the same as the continuous fiber. However, OPAN fiber is preferred for the staple fiber too.

In implementing the present invention, segments having a segment arc of, for example, 68 degrees are cut from the fabric sheet, with the segment having the outside diameter and the inside diameter of the preform to be manufactured. Sixty-eight degree arcs are preferred, since this arc dimension minimizes butt joint overlap within the parts being manufactured. However, other arc dimensions may be used if desired.

The inside and outside diameters of the arc segments are chosen based upon the preform to be manufactured. For instance, rotor preforms can be manufactured from segments having an inside radius of 5.5 inches and an outside radius of 10.5 inches. Stator preforms can be manufactured from segments having an inside radius of 4.875 inches and an outside radius of 9.75 inches. Those skilled in the art will have no difficulty in setting the appropriate inside and outside diameters for the specific preform type to be manufactured.

These segments are then needled together following a helical lay-up pattern to a specified weight and dimension, based upon the desired preform density for the application. The fabric layers are interlocked by the staple fibers, which are transported by the needles into the z-direction.

Needling

Needling may be carried out with an annular needling machine such as that described in U.S. Pat. No. 5,388,320, the entire disclosure of which is hereby expressly incorporated by reference. Annular needling is the process of continuously placing individual fabric segments (one at a time) onto a rotating closed cell polymeric foam ring having the inside diameter and outside diameter of the desired annular shape to which the segments are needled. One example of such a ring has an inside diameter of 10 inches and an outside diameter of 20 inches. However, those skilled in the art will appreciate that such dimensions can be varied widely, depending upon the shape to be manufactured. The segments are laid end to end and are needled together following a helical lay-up pattern to a desired weight and dimension.

The foam ring base provides the rigid structure on which the first few layers of segments are needled. The needles penetrate through the layers of fabric and into the foam ring. These segments layers are mechanically bonded to the foam ring as z-direction fibers (mainly the staple fibers) are transported through the fabric layers into the foam. This provides the integrity needed to assemble the subsequent layers of segments as the structure is manufactured. As the layers of segments are built, the segments are no longer needled into the foam ring but into the previous layers of segments by mechanically interlocking fiber bundles between the fabric layers.

Preforms

Figure 2:
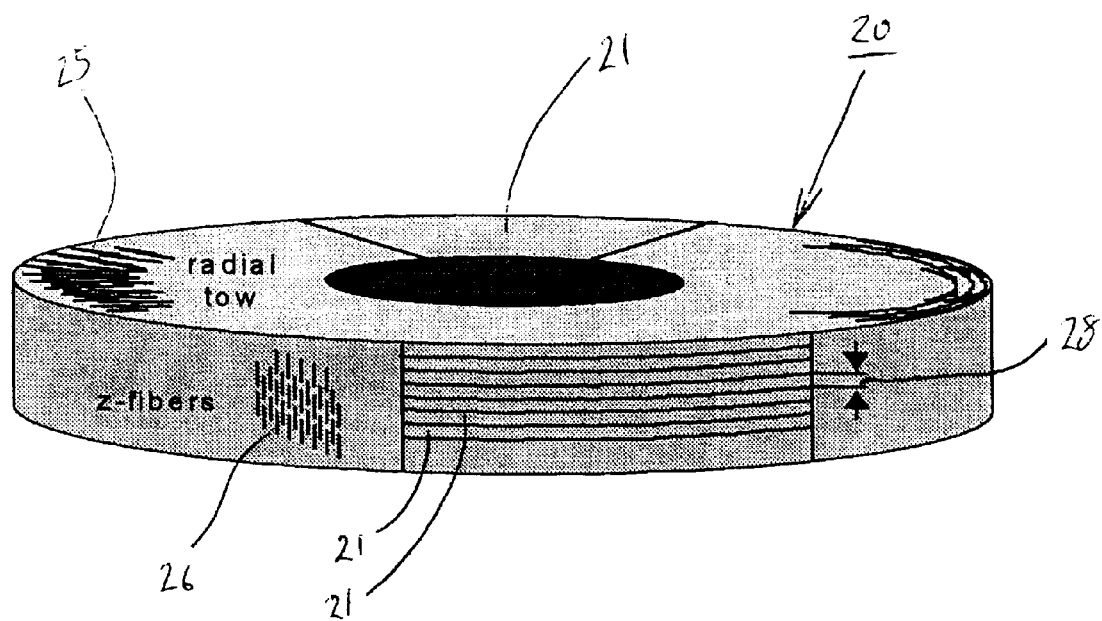
FIG. 2 illustrates, in a schematic perspective view, a preform of the present invention.

This layer needling process forms a thick annular ring called a preform. As the preform grows in thickness, it is lowered to maintain the same needle penetration depth from layer to layer. The resultant preform is composed of many layers of segments that are mechanically bonded together during the needling process. Typical preforms are made up of from 15 to 35 layers. However, those skilled in the art will appreciate that fewer or many more layers may be used, depending upon the shape to be manufactured. The foam ring is removed at the end of the preforming process. A resulting preform (20) is depicted in FIG. 2, made up of multiple segments (21) each having a thickness (28). In FIG. 2, the segments are characterized by radial tow (25). They are joined to segment layers above and below by staple fibers (26) that have been needled into the z-direction (that is, perpendicular to the planes of the segments).

Two preform architectures using this new concept of radially oriented fibers at the friction surface have been manufactured in accordance with the present invention. One preform architecture of this invention provides segments in which the continuous fibers are oriented parallel to the segment arc bisectors. These segments are referred to as radial segments, and are depicted in FIG. 1A. The other preform architecture of this invention provides preforms manufactured from alternating layers of fabric segments that are angled—within a specified range—with respect to the continuous fibers derived from the unidirectional tow. FIG. 1B illustrates +45 degree fiber oriented segments and −45 degree fiber oriented segments. The "−45" degree fiber oriented segments used in accordance with this invention can be made by changing the die cut angle, as shown in FIG. 1B, or simply by inverting "+45" degree segments.

The first preform architecture is manufactured from segments with all of the continuous fibers oriented in the radial direction. This means that the unidirectional tow fibers run parallel to the segment arc bisector. In combination with the, e.g., 68 degree arc of the segment, the bias from layer to layer of the preform is set to inhibit linear faults forming along the fiber length in the radial direction.

The second preform architecture is manufactured using two different segment types. In the first segment type, the unidirectional tow fibers run at a +45 degree angle to the segment arc bisector and in the second segment type, the unidirectional tow fibers run at a −45 degree angle to the segment arc bisector. The segment lay-up for this preform follows a +/−45 degree orientation. This lay-up pattern is repeated throughout the layering of the preform. This preform architecture provides a more desirable bias from layer to layer to improve overall mechanical properties of the composite disc.

The preforms manufactured from these architectures are heat-treated to a very high temperature, for instance to above 1500° C., in an inert atmosphere to convert the fibers to carbon. The precise temperature and length of time can be varied widely, so long as it provides carbonization of the fibers in the preform. The preforms are then densified using conventional processes to deposit carbon matrices in the fibrous preform substrates.

Densification

Deposition of carbon on the substrate is effected by in situ cracking of a carbon bearing gas. This process is referred to as Carbon Vapor Deposition (CVD) or Carbon Vapor Infiltration (CVI)—these terms are interchangeable for purposes of the present invention. Alternatively, the substrate can be repeatedly impregnated with liquid pitch or carbon bearing resin and thereafter charring the resin.

Carbon vapor infiltration and deposition (CVI/CVD) is a well known process for depositing a binding matrix within a porous structure. The terminology "carbon vapor deposition" (CVD) generally implies deposition of a surface coating, but the term is also used to refer to infiltration and deposition of a matrix within a porous structure. As used herein, the terminology CVI/CVD is intended to refer to infiltration and deposition of a matrix within a porous structure. The technique is particularly suitable for fabricating high temperature structural composites by depositing a carbonaceous or ceramic matrix within a carbonaceous or ceramic porous structure. These composites are particularly useful in structures such as carbon/carbon aircraft brake discs, and ceramic combustor or turbine components. The generally known CVI/CVD processes may be classified into four general categories: isothermal, thermal gradient, pressure gradient, and pulsed flow.

In an isothermal CVI/CVD process, a reactant gas passes around a heated porous structure at absolute pressures as low as a few millitorr. The gas diffuses into the porous structure driven by concentration gradients and cracks to deposit a binding matrix. This process is also known as "conventional" CVI/CVD. The porous structure is heated to a more or less uniform temperature, hence the term "isothermal," but this is actually a misnomer. Some variations in temperature within the porous structure are inevitable due to uneven heating (essentially unavoidable in most furnaces), cooling of some portions due to reactant gas flow, and heating or cooling of other portions due to heat of reaction effects. In essence, "isothermal" means that there is no attempt to induce a thermal gradient that preferentially affects deposition of a binding matrix. This process is well suited for simultaneously densifying large quantities of porous articles and is particularly suited for making carbon/carbon brake discs.

In a thermal gradient CVI/CVD process, a porous structure is heated in a manner that generates steep thermal gradients which induce deposition in a portion of the porous structure. The thermal gradients may be induced by heating only one surface of a porous structure, for example by placing a porous structure surface against a susceptor wall, and may be enhanced by cooling an opposing surface, for example by placing the opposing surface of the porous structure against a liquid cooled wall. Deposition of the binding matrix progresses from the hot surface to the cold surface.

In a pressure gradient CVI/CVD process, the reactant gas is forced to flow through the porous structure by inducing a pressure gradient from one surface of the porous structure to an opposing surface of the porous structure. Flow rate of the reactant gas is greatly increased relative to the isothermal and thermal gradient processes, which results in increased deposition rate of the binding matrix. This process is also known as "forced-flow" CVI/CVD. An annular porous wall may be formed, using this process, from a multitude of stacked annular discs (for making brake discs) or as a unitary tubular structure.

Finally, pulsed flow CVI/CVD involves rapidly and cyclically filling and evacuating a chamber containing the heated porous structure with the reactant gas. The cyclical action forces the reactant gas to infiltrate the porous structure and also forces removal of the cracked reactant gas by-products from the porous structure.

In all of these variants of the CVI/CVD process, carbon deposition is continued until a preset density is achieved for the friction material application. Following the densification process, a final heat treatment may be performed to set the thermal, mechanical, and frictional properties desired for the composite.

EXAMPLES

Example 1

A preform is manufactured totally from segments in which the continuous fibers are oriented parallel to the segment arc bisector. These segments are referred to as radial segments, and are depicted in FIG. 1. Needling is carried out with a conventional annular needling machine. Individual fabric segments are placed one at a time onto a rotating closed cell polymeric foam ring having the inside diameter and outside diameter of the annular shape of the preform being manufactured. The segments are laid end to end and needled together following a helical lay-up pattern to a desired weight and dimension. As the preform grows in thickness, it is lowered to maintain the same needle penetration depth from layer to layer. The resultant preform is composed of many layers of segments that are mechanically bonded together during the needling process. The foam ring is removed at the end of the performing process. The resulting preform is depicted schematically in FIG. 2.

Example 2

A preform was manufactured from alternating layers of +45 degree fiber oriented segments and −45 degree fiber oriented segments. An oxidized polyacrylonitrile fiber sold under the trade name Panox by SGL was used for both the continuous fiber and the staple fiber. The fabric was a duplex fabric composed of a carded needle punched staple web which had been needled to a layer of needle punched continuous tow. Segment thickness in the free stage form before the preform assembly needling process was 3–4 mm. Two different size segments were used in the manufacture of the preforms of this Example. Rotor preforms were manufactured from segments having an inside radius of 5.5 inches and on outside radius of 10.5 inches. Stator preforms were manufactured from segments having an inside radius of 4.875 inches and an outside radius of 9.75 inches. Both segments types were manufactured using the 68 degree arc. The number of segment layers in the preforms used in this Example ranged form 26 to 32. These segments were derived from +45 degree and −45 degree segments like those depicted in FIG. 1B. In this embodiment of the invention, the continuous fibers were at a +45 degree fiber angle to the segment arc bisector in half of the layers of the preform, and each of the +45 degree segment layers was separated from other +45 degree segment layers by a −45 degree segment layer. The −45 orientation was achieved by inverting +45 degree segments.

Needling was carried out with a conventional annular needling machine. Individual fabric segments were placed one at a time onto a rotating closed cell polymeric foam ring having the inside diameter and outside diameter of the annular shape of the preform being manufactured. The segments were laid end to end and needled together following a helical lay-up pattern to a desired weight and dimension. As the preform grew in thickness, it was lowered to maintain the same needle penetration depth from layer to layer. The resultant preform was composed of many layers of segments that are mechanically bonded together during the needling process. The foam ring was removed at the end of the preforming process. The resulting preform is depicted schematically in FIG. 2.

The preforms manufactured from these architectures were heat-treated to a approximately 1500° C., in an inert atmosphere, to convert the fibers to carbon. The performs were then densified with a mixed hydrocarbon gas, using a forced flow CVI/CVD process to deposit carbon matrices in the fibrous preform substrates. Finally, the densified preforms were heated again to above 1500° C. to set desired thermal, mechanical, and frictional properties for the composite.

Example 3

Full size aircraft brake discs were made following the +/−45 degree architecture procedure of Example 2. The discs were configured in standard B767–300 geometry. The full scale brake was of a four rotor configuration. That is, the brake was composed of 4 rotors, 3 stators, 1 pressure plate, and 1 backing plate. The approximate dimensions of the components were as follows:

| Brake part | Outside Diameter (inches) | Inside Diameter (inches) | Thickness (inches) |
| --- | --- | --- | --- |
| Rotor | 18.13 | 11.00 | 1.06 |
| Stator | 16.75 | 10.00 | 1.06 |
| Pressure plate | 16.75 | 10.00 | 0.97 |
| Backing plate | 16.75 | 11.00 | 0.80 |

These discs were subjected to a Wear test designed to mimic a standard commercial aircraft usage spectrum, including cold taxi stops (representing pre-takeoff taxi stops), a landing stop, and a series of hot taxi stops (representing post-landing taxi stops as the aircraft approaches the gate). Wear test landing energies are distributed between various energy levels representing the variations in aircraft loadings which occur in actual commercial service.

The Wear test was run as follows:
Sequence #1—nine cold taxis, 50% service energy (1.463 Mft-lbs) landing stop, seven hot taxis. (Sequence repeated 120 times.)
Sequence #2—nine cold taxis, 75% service energy (2.194 Mft-lbs) landing stop, seven hot taxis. (Sequence repeated 60 times.)

Sequence #3—nine cold taxis, 100% service energy (2.925 Mft-lbs) landing stop, seven hot taxis. (Sequence repeated 20 times.)

Each test was run once in a Single Rotor Brake configuration and once in a Full Brake configuration. For the Single Rotor Brake test, the resulting wear was only 84 micro-inches/surface/sequence, and for the Full Brake test, the resulting wear was only 92 micro-inches/surface/sequence. In comparison, conventional B767 brake discs show a wear in these tests of 154 micro-inches/surface/sequence.

It is to be understood that the foregoing description and specific embodiments are merely illustrative of the principles of the invention. Modifications and additions to the invention may easily be made by those skilled in the art without departing from the spirit and scope of the invention as it is recapitulated in the appended claims.

What is claimed is:

1. A method for making a preform composite, which method comprises the steps of
   a.) providing a needle-punched nonwoven fabric comprising a major portion of unidirectional continuous fiber tow and a minor portion of staple fiber web,
   b.) making from said fabric a plurality of segments having the continuous fibers oriented at a 45 degree angle with respect to a segment arc bisector and having the outside diameter and the inside diameter of the preform to be manufactured from the fabric,
   c.) arranging said segments in alternating layers in which their continuous fibers are oriented alternatively at a +45 degree angle with respect to the segment arc bisector and at a −45 degree angle with respect to the segment arc bisector to provide a multilayered intermediate having a weight and dimension calculated to provide a desired preform density,
   d.) heating said multilayered intermediate to a temperature above 1500° C. in an inert atmosphere for an amount of time sufficient to convert the fibers to a carbonized product, and
   e.) densifying the carbonized product by carbon deposition to the desired preform density.

2. The method of claim 1, wherein a finished disc is produced having a density in the range 1.70–1.80 g/cc.

3. A method of reducing wear in an annular brake disc which comprises manufacturing said disc from a preform made by the method of claim 1.

4. The method of claim 3, wherein wear of the brake disc is reduced by more than 25% compared to wear of an otherwise comparable brake disc made from preforms in which 50% of said continuous fibers are located outside of the 120° arcs bisected by the radii of each of the preform segments.

* * * * *